United States Patent
Yamamoto et al.

(10) Patent No.: US 11,494,918 B2
(45) Date of Patent: Nov. 8, 2022

(54) MOVING STATE ANALYSIS DEVICE, MOVING STATE ANALYSIS METHOD, AND PROGRAM

(71) Applicant: NIPPON TELEGRAPH AND TELEPHONE CORPORATION, Tokyo (JP)

(72) Inventors: Shuhei Yamamoto, Tokyo (JP); Hiroyuki Toda, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 17 days.

(21) Appl. No.: 15/733,870

(22) PCT Filed: May 7, 2019

(86) PCT No.: PCT/JP2019/018276
§ 371 (c)(1),
(2) Date: Nov. 30, 2020

(87) PCT Pub. No.: WO2019/235116
PCT Pub. Date: Dec. 12, 2019

(65) Prior Publication Data
US 2021/0225008 A1     Jul. 22, 2021

(30) Foreign Application Priority Data
Jun. 4, 2018   (JP) .............................. JP2018-107057

(51) Int. Cl.
*G06K 9/00*     (2022.01)
*G06T 7/246*     (2017.01)

(52) U.S. Cl.
CPC .... *G06T 7/246* (2017.01); *G06T 2207/10016* (2013.01); *G06T 2207/20081* (2013.01); *G06T 2207/20084* (2013.01)

(58) Field of Classification Search
CPC .......... G06T 7/246; G06T 2207/10016; G06T 2207/20081; G06T 2207/20084
(Continued)

(56) References Cited

U.S. PATENT DOCUMENTS

| | | | | |
|---|---|---|---|---|
| 2016/0071284 A1* | 3/2016 | Kontschieder | ......... | G06N 20/00 382/107 |
| 2016/0203360 A1* | 7/2016 | Alvarez | .............. | G06F 3/04845 345/156 |
| 2016/0279501 A1 | 9/2016 | Jang et al. | | |

FOREIGN PATENT DOCUMENTS

JP     2018041319 A     3/2018

OTHER PUBLICATIONS

Song, Sibo, et al. "Multimodal multi-stream deep learning for egocentric activity recognition." Proceedings of the IEEE conference on computer vision and pattern recognition workshops. 2016. (Year: 2016).*

(Continued)

*Primary Examiner* — Jonathan S Lee

(57) ABSTRACT

A moving state analysis device improves accuracy of moving state recognition by including a detection unit configured to detect, from image data associated with a frame, an object and a region of the object, for each of frames that constitute first video data captured in a course of movement of a first moving body, and a learning unit configured to learn a DNN model that takes video data and sensor data as input and that outputs a probability of each moving state, based on the first video data, a feature of first sensor data measured in relation to the first moving body and corresponding to a capture of the first video data, a detection result of the object and the region of the object, and information that indicates a moving state associated with the first video data.

16 Claims, 20 Drawing Sheets

(58) Field of Classification Search
USPC .......................................................... 382/107
See application file for complete search history.

(56) References Cited

OTHER PUBLICATIONS

Zheng et al. (2008) "Learning transportation mode from raw GPS data for geographic applications on the web" In Proc. of World Wide Web, pp. 247-256.
Kwapisz et al, (2010) "Activity Recognition using Cell Phone Accelerometers", Proc. of SensorKDD 12(2).
Dalal, Navneet et al, (2005) "Histograms of Oriented Gradients for Human Detection", In Proc. of Computer Vision and Pattern Recognition, pp. 886-893.
Redmon et al, (2016) "You Only Look Once: Unified, Real-Time Object Detection", Proc. of Computer Vision and Pattern Recognition, pp. 779-788.
Krizhevsky et al, (2012) "ImageNet Classification with Deep Convolutional Neural Networks", pp. 1106-1114.
Gers et al, (2002) "Learning precise timing with LSTM recurrent networks" Journal of Machine Learning Research, vol. 3, pp. 115-143.
European Patent Application No. 19815731.5, Extended European Search Report dated Jun. 2, 2021, 9 pages.

\* cited by examiner

FIG.5

| DATA ID | VIDEO DATA | 121 |
|---|---|---|
| 1 | VIDEO FILE COMPRESSED BY Mpeg4 AND SUCH | |
| 2 | | |
| 3 | | |
| 4 | | |
| 5 | | |
| 6 | | |

FIG.6

| SEQUENCE ID | DATA ID | DATE-AND-TIME | LATITUDE | LONGITUDE | X-AXIS ACCELERATION (m/s²) | Y-AXIS ACCELERATION (m/s²) | ... |
|---|---|---|---|---|---|---|---|
| 1 | 1 | 2016-6-20-12:00 | 35.511244 | 135.668943 | 1 | 0.1 | ... |
| 2 | 1 | 2016-6-20-12:10 | 35.511223 | 135.667654 | 3 | 0.2 | ... |
| 3 | 1 | 2016-6-20-12:20 | 35.512344 | 135.665643 | 4 | 0.1 | ... |
| 4 | 1 | 2016-6-20-12:30 | 35.511314 | 134.664444 | 2 | 0.3 | ... |
| 5 | 2 | 2016-6-20-12:00 | 35.511244 | 135.668943 | 10 | 0.1 | ... |
| 6 | 2 | 2016-6-20-12:00 | 35.511244 | 135.668943 | 8 | 0.2 | ... |
| ... | ... | ... | ... | ... | ... | ... | ... |

| DATA ID | ANNOTATION NAME |
|---|---|
| 1 | OTHER |
| 2 | CAR NEAR-MISS |
| 3 | BICYCLE NEAR-MISS |
| 4 | MOTORCYCLE NEAR-MISS |
| 5 | ... |
| 6 | ... |

| DATA ID | FRAME NUMBER | DATE-AND-TIME | DESIGNATION | LEFT EDGE | TOP EDGE | RIGHT EDGE | BOTTOM EDGE |
|---|---|---|---|---|---|---|---|
| 1 | 1 | 2016-6-20-12:00 | TRAFFIC LIGHT | 12 | 24 | 85 | 92 |
| 1 | 1 | 2016-6-20-12:00 | CAR | 100 | 120 | 200 | 250 |
| 1 | ... | ... | ... | ... | ... | ... | ... |
| 1 | N | 2016-6-20-12:00 | PEDESTRIAN | 280 | 221 | 330 | 321 |
| 2 | 1 | 2016-6-20-12:10 | MOTORCYCLE | 20 | 300 | 100 | 400 |
| 2 | 1 | 2016-6-20-12:10 | TRUCK | 211 | 232 | 344 | 311 |
| ... | ... | ... | ... | ... | ... | ... | ... |

FIG.15

| DATA ID | FRAME NUMBER | TIMESTAMP | SPATIAL FEATURE EMBEDDED DATA (DATA REPRESENTED BY VERTICAL GRID × HORIZONTAL GRID × NUMBER OF OBJECTS) |
|---|---|---|---|
| 1 | 1 | 00:00:00 | 0.01 0.02 0.21 0.14 / 0.51 1.21 0.06 0.37 / 0.66 3.23 0.04 0.22 / 0.02 0.01 0.13 0.05 |
| 1 | 2 | 00:00:03 | |
| 1 | ⋮ | ⋮ | ⋮ |
| 1 | N | 00:00:09 | |
| 2 | 1 | 00:00:00 | |
| 2 | 2 | 00:00:03 | |

FIG.19

| PARAMETER NAME | PARAMETER VALUE |
|---|---|
| CONVOLUTIONAL LAYER A | $\begin{bmatrix} 0.1 & \cdots & 0.3 \\ \vdots & \ddots & \vdots \\ 0.2 & \cdots & 0.1 \end{bmatrix} \cdots$ |
| CONVOLUTIONAL LAYER B | $\begin{bmatrix} 0.1 & \cdots & 0.3 \\ \vdots & \ddots & \vdots \\ 0.2 & \cdots & 0.1 \end{bmatrix} \cdots$ |
| FULLY-CONNECTED LAYER A | $\begin{bmatrix} 0.1 & \cdots & 0.3 \\ \vdots & \ddots & \vdots \\ 0.2 & \cdots & 0.1 \end{bmatrix} \cdots$ |
| FULLY-CONNECTED LAYER B | $\begin{bmatrix} 0.1 & \cdots & 0.3 \\ \vdots & \ddots & \vdots \\ 0.2 & \cdots & 0.1 \end{bmatrix} \cdots$ |
| FULLY-CONNECTED LAYER C | $\begin{bmatrix} 0.1 & \cdots & 0.3 \\ \vdots & \ddots & \vdots \\ 0.2 & \cdots & 0.1 \end{bmatrix} \cdots$ |
| LSTM | $\begin{bmatrix} 0.1 & \cdots & 0.3 \\ \vdots & \ddots & \vdots \\ 0.2 & \cdots & 0.1 \end{bmatrix} \cdots$ |
| FULLY-CONNECTED LAYER D | $\begin{bmatrix} 0.1 & \cdots & 0.3 \\ \vdots & \ddots & \vdots \\ 0.2 & \cdots & 0.1 \end{bmatrix} \cdots$ |
| OUTPUT LAYER (VECTOR) | {1: "OTHER", 2: "CAR NEAR-MISS", 3: "BICYCLE NEAR-MISS", 4: "MOTORCYCLE NEAR-MISS", ... } |

MOVING STATE ANALYSIS DEVICE, MOVING STATE ANALYSIS METHOD, AND PROGRAM

CROSS-REFERENCE TO RELATED APPLICATIONS

This application is a U.S. 371 Application of International Patent Application No. PCT/JP2019/018276, filed on 7 May 2019, which application claims priority to and the benefit of JP Application No. 2018-107057, filed on 4 Jun. 2018, the disclosures of which are hereby incorporated herein by reference in their entireties.

TECHNICAL FIELD

The present invention relates to a moving state analysis device, a moving state analysis method, and program.

BACKGROUND OF THE INVENTION

With the miniaturization of video imaging devices and power savings in GPS, gyroscopic sensors, and the like, it has become easy to record actions of a user as a variety of data such as video, positioning information, and acceleration. Detailed analysis of user actions from such data is useful for a variety of applications. For example, if a situation such as window shopping or crossing a pedestrian crossing could be automatically recognized and analyzed, by using first-person view videos obtained through eyewear and the like and acceleration data and the like obtained by wearable sensors, it would be useful in a variety of applications such as in personalizing services.

Conventionally, as technology for automatically recognizing a user's moving state from sensor information, there exists technology for estimating a user's transportation mode from positioning information and velocity information of GPS (Non-Patent Document 1). Additionally, using information of acceleration and the like obtained from a smartphone, development of technology analyzing walking and jogging, climbing stairs and the like is also being undertaken (Non-Patent Document 2).

RELATED ART DOCUMENTS

Non-Patent Documents

[Non-Patent Document 1] Zheng, Y., Liu, L., Wang, L., and Xie, X.: Learning transportation mode from raw GPS data for geographic applications on the web. In Proc. of World Wide Web 2008, pp. 247-256, 2008.
[Non-Patent Document 2] Jennifer R. Kwapisz, Gary M. Weiss, Samuel A. Moore: Activity Recognition using Cell Phone Accelerometers, Proc. of SensorKDD 2010.

SUMMARY OF THE INVENTION

Problem to be Solved by the Invention

However, as the conventional methods above use sensor information only, they have not been able to perform identification of a user's moving state with consideration of video information. For example, when trying to ascertain a user's moving state from wearable sensor data, even if understanding that the user is walking, it is difficult from only sensor data to automatically recognize a specific situation of a user, such as whether window shopping or crossing a pedestrian crossing.

On the other hand, in combining inputs of video data and sensor data, when using a simple classification model such as SVM (Support Vector Machine), which is one machine learning technology, highly accurate moving state recognition was difficult due to differing levels of abstraction with respect to the information from the video data and from the sensor data.

The present invention is made in view of the point above, and has the objective of improving the accuracy of moving state recognition.

Means for Solving the Problem

To solve the above problem, a moving state analysis device includes a detection unit configured to detect, from image data associated with a frame, an object and a region of the object, for each of frames that constitute first video data captured in a course of movement of a first moving body, and a learning unit configured to learn a DNN model that takes video data and sensor data as input and that outputs a probability of each moving state, based on the first video data, a feature of first sensor data measured in relation to the first moving body and corresponding to a capture of the first video data, a detection result of the object and the region of the object, and information that indicates a moving state associated with the first video data.

Advantage of the Invention

It is possible for the accuracy of moving state recognition to be improved.

BRIEF DESCRIPTION OF THE DRAWINGS

FIG. 5 is a diagram illustrating a configuration example of a video data DB 121.
FIG. 6 is a diagram illustrating a configuration example of a sensor data DB 122.
FIG. 7 is a diagram illustrating a configuration example of an annotation DB 124.

FIG. 13 is a diagram illustrating an example of an object detection result.

FIG. 15 is a diagram illustrating an example of spatial feature embedded data.

FIG. 19 is a diagram illustrating an example of model parameters.

MODE FOR CARRYING OUT THE INVENTION

Figure 1:
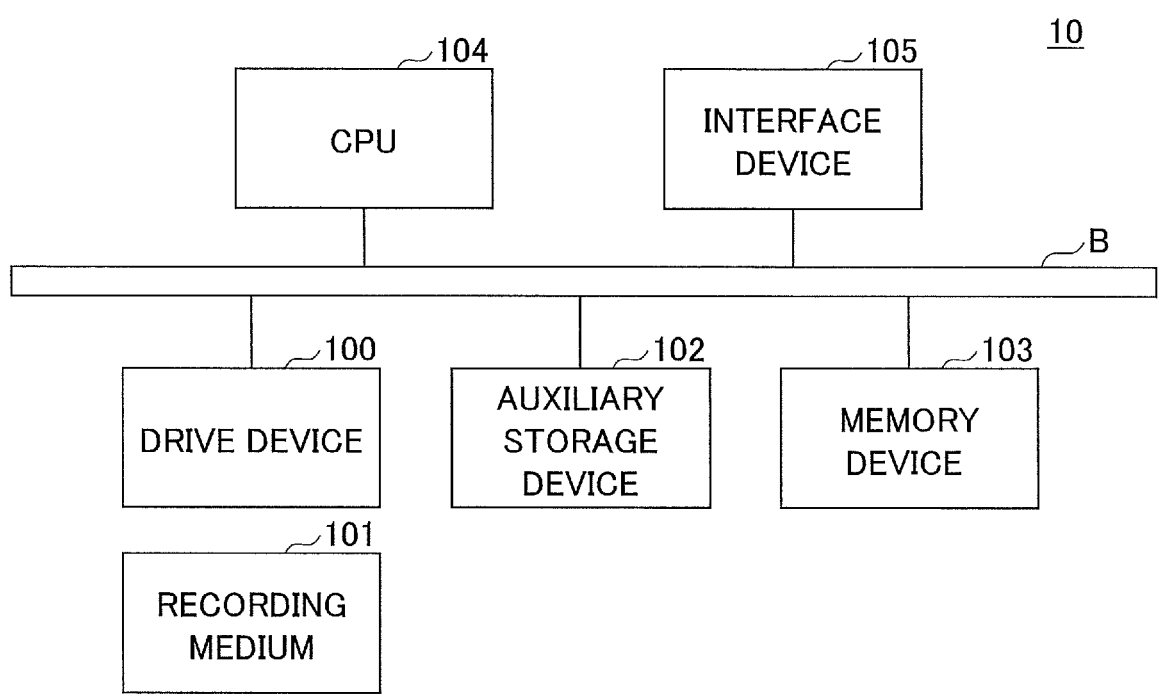
FIG. 1 is a diagram illustrating a hardware configuration of a moving state recognition device 10 in an embodiment of the present invention.

Hereinafter, an embodiment of the present invention is explained based on the drawings. FIG. 1 is a diagram illustrating a hardware configuration of a moving state recognition device 10 in an embodiment of the present invention. The moving state recognition device 10 of FIG. 1 includes a drive device 100, an auxiliary storage device 102, a memory device 103, a CPU 104, and an interface device 105 and the like mutually interconnected through a bus B.

The programs implementing the processing by the moving state recognition device 10 are provided by a recording medium 101 of a CD-ROM or the like. When the recording medium 101 in which the programs are stored is set in the drive device 100, the programs are installed in the auxiliary storage device 102 from the recording medium 101 through the drive device 100. However, the programs are not necessarily installed from the recording medium 101, and may be downloaded from another computer through a network. The auxiliary storage device 102 stores necessary files, folders, and such along with storing the installed programs.

The memory device 103 reads out and stores programs from the auxiliary storage device 102, in response to a program start command. The CPU 104 executes functions related to the moving state recognition device 10 in accordance with programs stored in the memory device 103. The interface 105 is used as an interface for connecting to a network.

Figure 2:
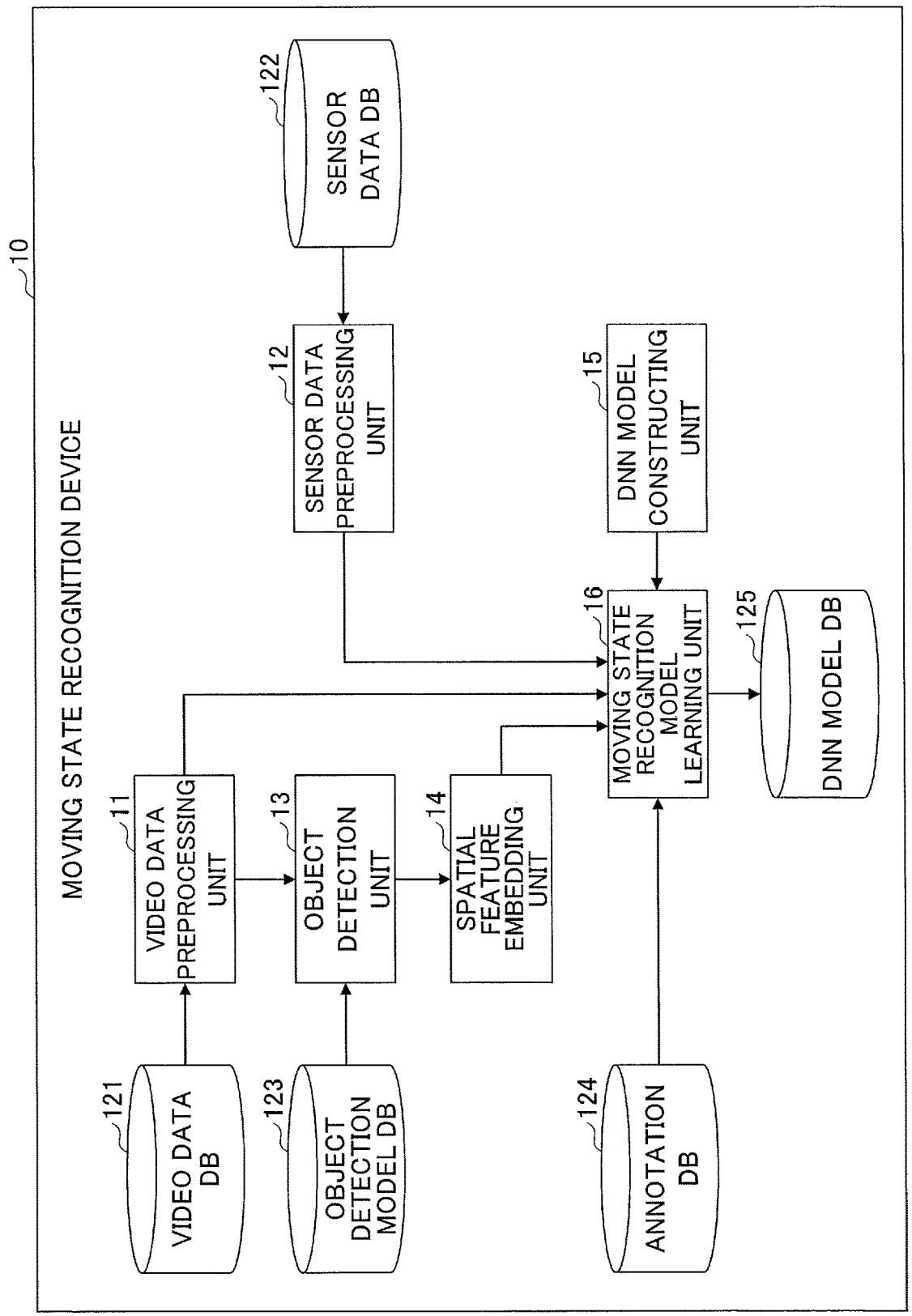
FIG. 2 is a diagram illustrating a functional configuration of the moving state recognition device 10 in a learning phase.

FIG. 2 is a diagram illustrating a functional configuration example of the moving state recognition device 10 in a learning phase. With respect to the learning phase, the moving state recognition device 10 includes a video data preprocessing unit 11, a sensor data preprocessing unit 12, an object detection unit 13, a spatial feature embedding unit 14, a DNN model constructing unit 15, and a moving state recognition model learning unit 16. These units are actualized by processing executed in the CPU 104 of the one or more programs installed in the moving state recognition device 10. The moving state recognition device 10, additionally, with respect to the learning phase, uses a video data DB 121, a sensor data DB 122, an object detection model DB 123, an annotation DB 124, a DNN model DB 125, and the like. Each of these DB (Data Base) can be actualized using the auxiliary storage device 102, a storage device connectable to the moving state recognition device 10 through a network, or the like.

In the learning phase, the moving state recognition device 10 outputs a moving state recognition DNN (Deep Neural Network) model using information stored in the respective DBs.

In the video data DB 121, 1 or more of video data is stored. In the present embodiment, 1 video data is regarded as moving image data captured over the course of movement of a vehicle, in accordance with a camera (for example, a drive recorder and the like) mounted in the vehicle.

In the sensor data DB 122, sensor data measured by each type of sensor, in the vehicle in which the camera captures the video data, is stored.

Note that in the video data DB 121 and the sensor data DB 122, the video data or the sensor data is stored correlated with a common data ID such that correspondence of corresponding video data and sensor data can be understood. Corresponding video data and sensor data refers to video data and sensor data that are captured and measured in a same vehicle and same time interval. For example, when a video data-sensor data pair is input by a system operator, the video data may be stored in the video data DB 121 and the sensor data may be stored in the sensor data DB 122, with an ID as a data ID uniquely identifying the pair being assigned to the input video data and sensor data.

In the object detection model DB 123, a model structure of the trained (learned) object detection model and parameters are stored. Here, object detection refers to detecting the general name of an object (object name) projected in one image along with a boundary region projected by the object. For the object detection model, it is possible to use a publicly known model such as an SVM trained by image features such as from HOG, or a DNN such as YOLO. Note that there is detail regarding HOG in "Dalal, Navneet and Triggs, Bill: Histograms of Oriented Gradients for Human Detection. In Proc. of Computer Vision and Pattern Recognition 2005, pp. 886-893, 2005". Additionally, there is detail regarding YOLO in "J. Redmon, S. Divvala, R. Girshick and A. Farhadi: You Only Look Once: Unified, Real-Time Object Detection, Proc. of Computer Vision and Pattern Recognition 2016, pp. 779-788, 2016".

In the annotation DB 124, annotation names corresponding to respective data IDs are stored. Here, an annotation name is assumed to be a character string explaining a situation corresponding to video data, and is applicable to "car near-miss", "bicycle near-miss", or the like. Similarly to the video data DB 121 or the sensor data DB 122, for the annotation DB 124 also, annotation names corresponding to respective data IDs may be input by a system operator, and the input results may be stored in the annotation DB 124.

Figure 3:
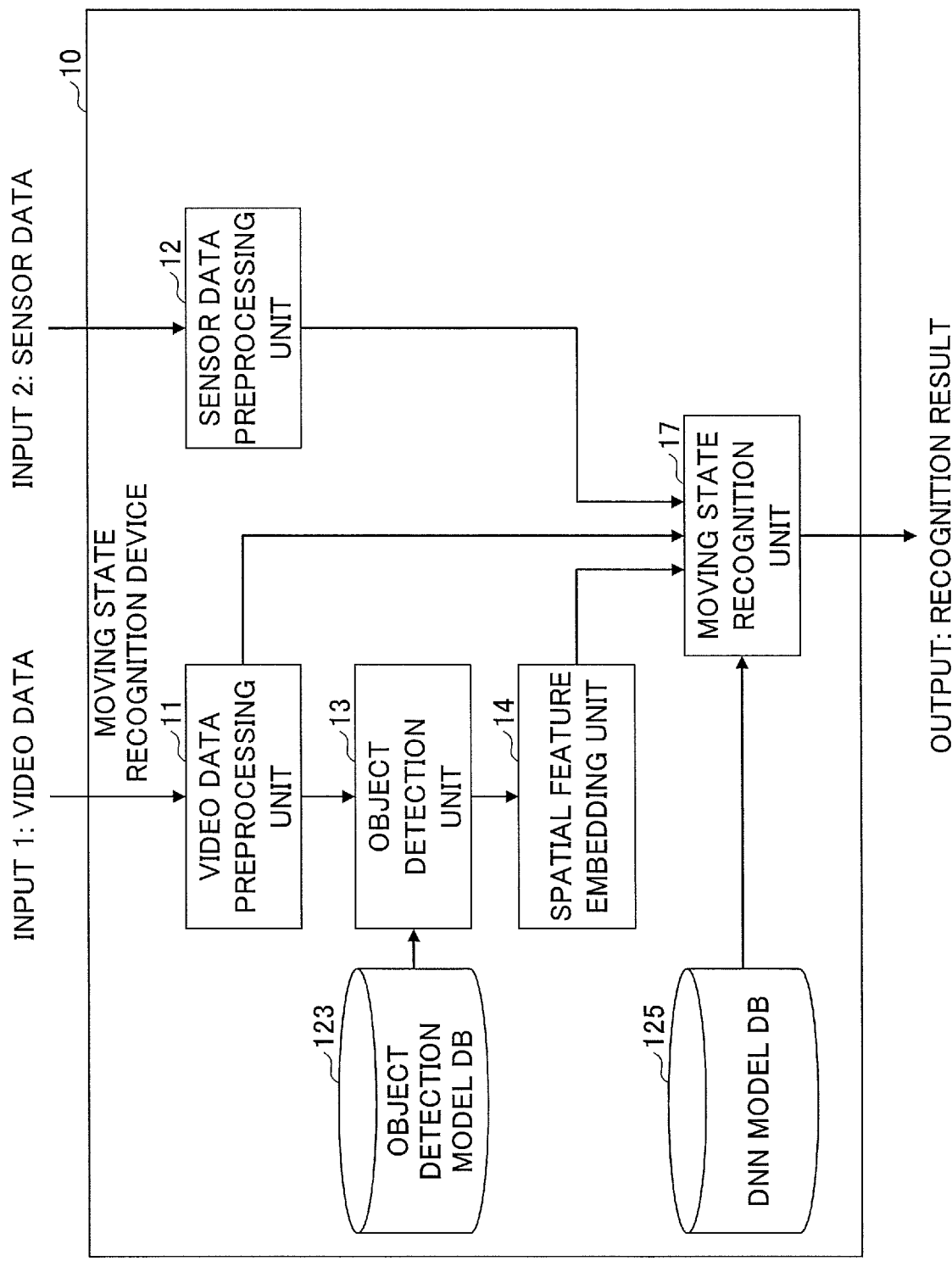
FIG. 3 is a diagram of a functional configuration of the moving state recognition device 10 in a recognition phase.

FIG. 3 is a diagram illustrating a functional configuration example of the moving state recognition device 10 in a recognition phase. In FIG. 3, parts that are the same as in FIG. 2 are denoted with the same symbols, and the explanation thereof is omitted.

In the recognition phase, the moving state recognition device 10 includes a video data preprocessing unit 11, a sensor data preprocessing unit 12, an object detection unit 13, a spatial feature embedding unit 14, and a moving state recognition unit 17. The moving state recognition unit 17 is actualized by processing executed in the CPU 104 of the one or more programs installed in the moving state recognition device 10. The moving state recognition device 10 additionally uses an object detection model DB 123 and a DNN model DB 125 in the recognition phase.

In the recognition phase, the moving state recognition device 10 outputs a recognition result corresponding to input video data and input sensor data, using information stored in each DB. The input video data is, for example, video data that differs from the video data stored in the video data DB 121 and that is captured in the same vehicle or a different vehicle as the vehicle that captured the video data stored in the video data DB 121. Additionally, the input sensor data refers to sensor data that is measured in the same vehicle as the vehicle that captured the input video data and that is measured in the same time interval as the time interval of capturing the corresponding video data.

Note that different computers may be used for the learning phase and the recognition phase.

Figure 4:
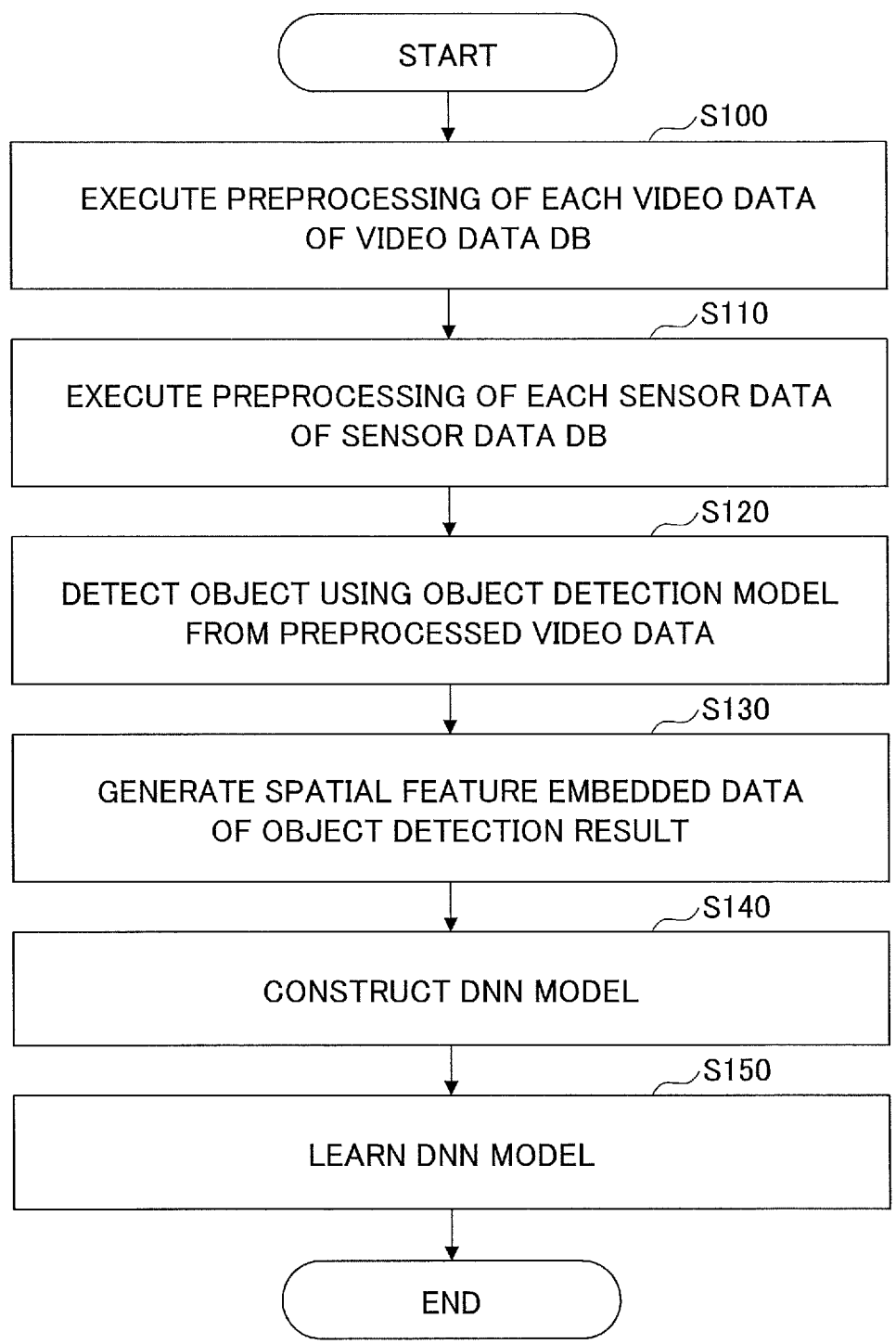
FIG. 4 is a flowchart for explaining an example of a processing procedure executed by the moving state recognition device 10 in the learning phase.

Below, the processing procedure executed by the moving state recognition device 10 is described. FIG. 4 is a flowchart for explaining an example of a processing procedure executed by the moving state recognition device 10 in the learning phase.

In Step S100, the video data preprocessing unit 11 acquires each video data from the video data DB 121, and executes preprocessing for each video data.

FIG. 5 is a diagram illustrating a configuration example of a video data DB 121. As illustrated in FIG. 5, in the video data DB 121, video data corresponding to data IDs so as to be linked with sensor data is stored. Video data is stored, for example, in files compressed by an Mpeg4 format and the like. Note that video data of differing data IDs is, for example, video data of which the vehicles that captured the data differ, or video data of which the capturing intervals differ.

As a result of the preprocessing, each video data is converted to a format that is easily usable by the DNN model. Hereinafter, the data generated by preprocessing is referred to as "preprocessed video data". Note that detail of the preprocessing of the video data is described later.

Next, the sensor data preprocessing unit 12 acquires each sensor data from the sensor data DB 122, and executes preprocessing for each sensor data. (S110).

FIG. 6 is a diagram illustrating a configuration example of a sensor data DB 122. Each sensor data is assigned an individual sequence ID, and is stored corresponding to a data ID so as to be linked with the video data. Each sensor data includes elements of date-and-time, latitude and longitude, X-axis acceleration and Y-axis acceleration, and the like.

As a result of the preprocessing, each sensor data is converted to a format that is easily usable by the DNN model (later-described "feature vector"). Hereinafter, the data generated by preprocessing is referred to as "preprocessed sensor data". Note that detail of the preprocessing of the sensor data is described later.

Next, the object detection unit 13 receives preprocessed video data from the video data preprocessing unit 11, and, by using the object detecting model stored in the object detection model DB 123, from the preprocessed video data, detects the object name and region of each object included in the video data (S120). Detail of this process is described later.

Next, the spatial feature embedding unit 14 receives an object detection result from the object detection unit 13, and generates spatial feature embedded data of the object detection result (S130). Detail of the process and detail of the spatial feature embedded data are described later.

Next, the DNN model constructing unit 15 constructs the DNN model (S140). Detail of the DNN model is described later.

Next, the moving state recognition model learning unit 16 receives preprocessed video data from the video data preprocessing unit 11, preprocessed sensor data from the sensor data preprocessing unit 12, spatial feature embedded data from the spatial feature embedding unit 14, a DNN model from the DNN model constructing unit 15, and annotation data from the annotation DB 124, learns the DNN model, and outputs the DNN model as the learning result to the DNN model DB 125 (S150).

FIG. 7 is a diagram illustrating a configuration example of the annotation DB 124. As illustrated in FIG. 7, in the annotation DB 124, annotation names associated with respective data IDs are recorded.

Figure 8:
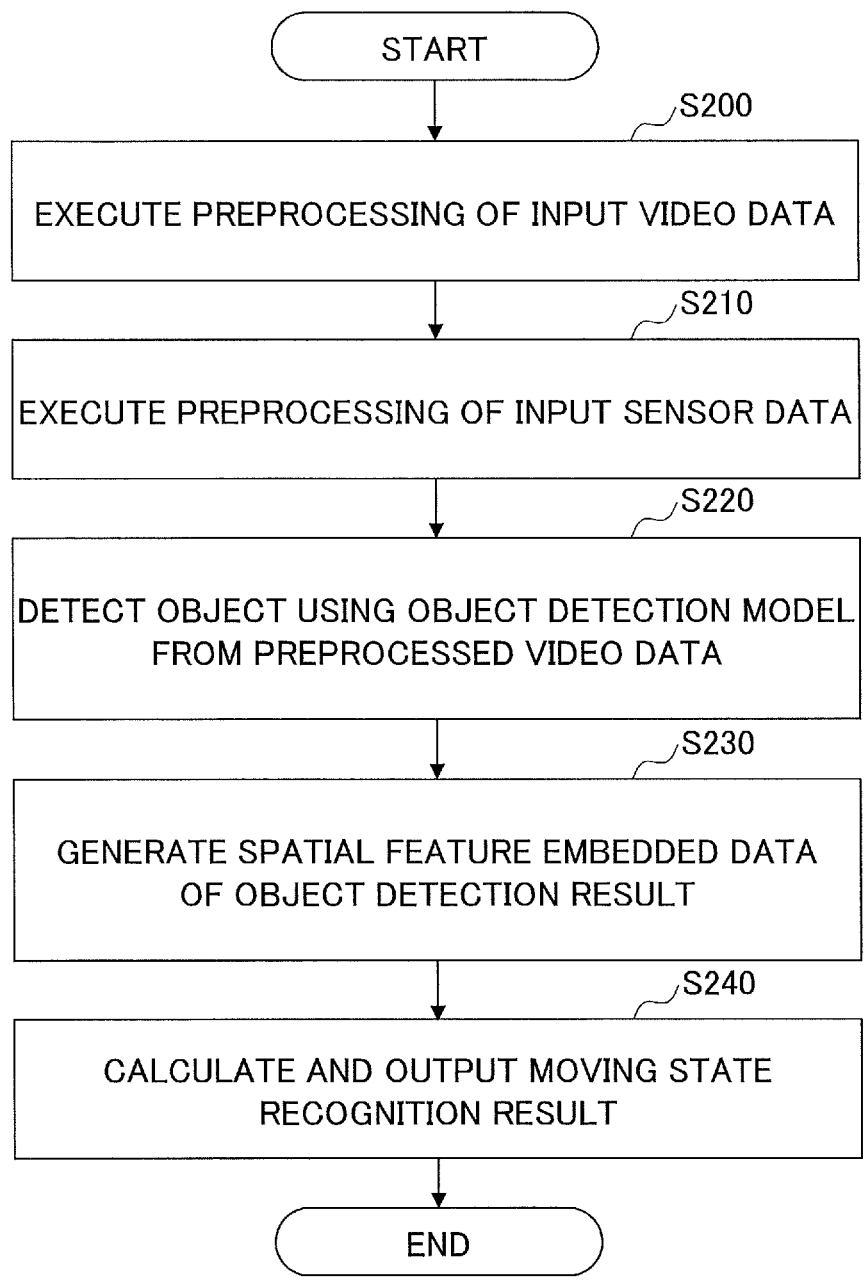
FIG. 8 is a flowchart for explaining an example of a processing procedure executed by the moving state recognition device 10 in the recognition phase.

FIG. 8 is a flowchart for explaining an example of a processing procedure executed by the moving state recognition device 10 in the recognition phase.

In step S200, the video data preprocessing unit 11 receives video data as input, and for the video data, executes preprocessing similarly to step S100. Hereinafter, the data generated by preprocessing is referred to as "preprocessed video data".

Next, the sensor data preprocessing unit 12 receives sensor data as input, and for the sensor data, executes preprocessing similarly to step S110 (S210). Hereinafter, the data generated by preprocessing is referred to as "preprocessed sensor data".

Next, the object detection unit 13 receives preprocessed video data from the video data preprocessing unit 11, and, by using the object detecting model stored in the object detection model DB 123, from the preprocessed video data, detects the object name and region of each object included in the video data (S220).

Next, the spatial feature embedding unit 14 receives an object detection result from the object detection unit 13, and generates spatial feature embedded data of the object detection result (S230). Although detail of the spatial feature embedded data is described later, one example of the spatial feature embedded data is data that indicates features of respective regions (region of a video [image]) in which the objects appear.

Next, a moving state recognition unit 17 receives preprocessed video data from the video data preprocessing unit 11, preprocessed sensor data from the sensor data preprocessing unit 12, spatial feature embedded data from the spatial feature embedding unit 14, and a learned DNN model from the DNN model DB 125, calculates a moving state recognition result on a basis of these, and outputs the calculated result (S240).

Figure 9:
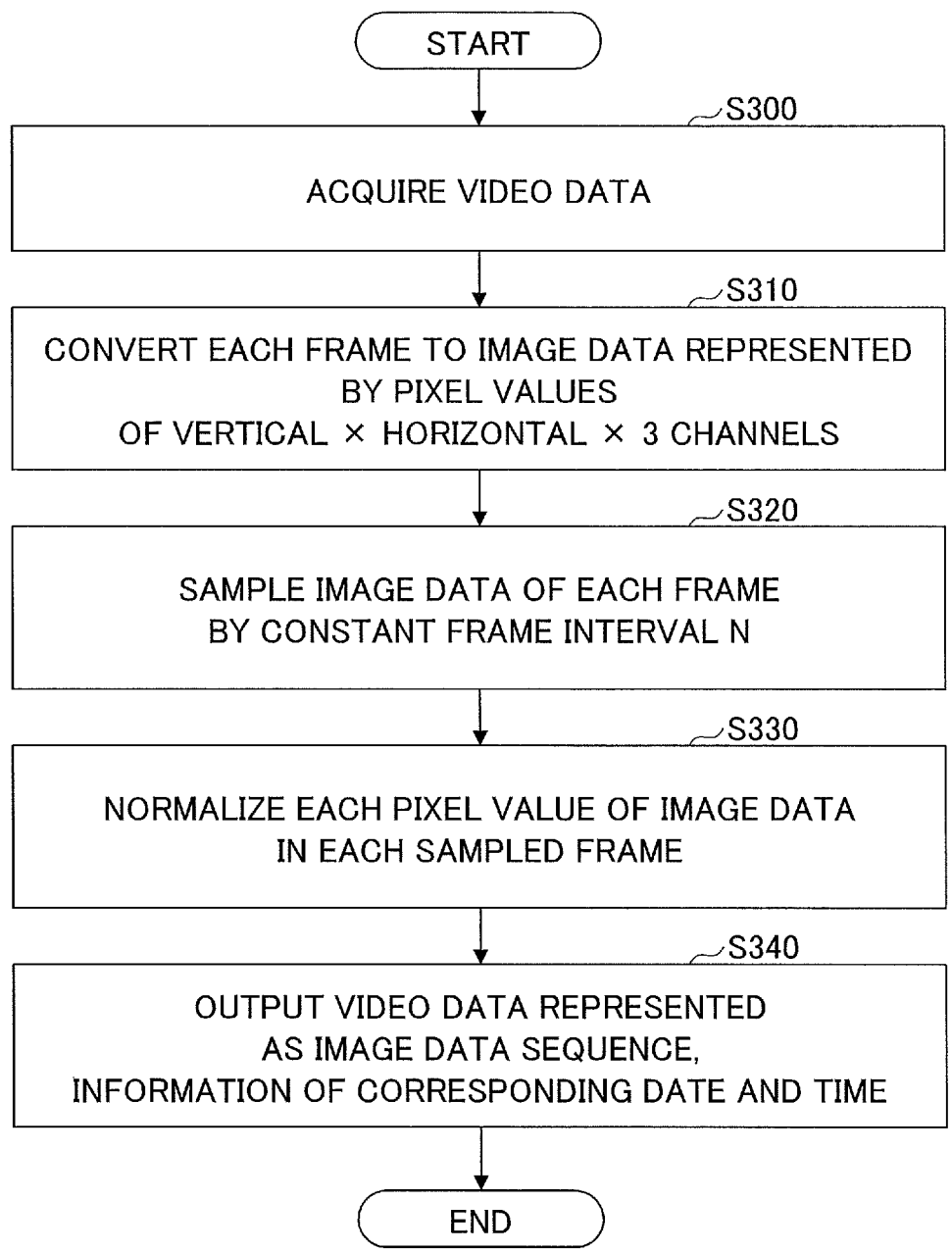
FIG. 9 is a flowchart for explaining an example of a processing procedure executed by a video data preprocessing unit 11.

Next, detail of step S100 of FIG. 4 and step S200 of FIG. 8 is explained. FIG. 9 is a flowchart for explaining an example of a processing procedure executed by the video data preprocessing unit 11. The processing procedure of FIG. 9 is executed for each data ID in the learning phase case and executed for one input video data in the recognition phase case.

In step S300, the video data preprocessing unit 11 acquires video data of a processing target (Hereinafter, this is referred to as "target video data".). The video data of the processing target in the learning phase case is video data associated with the data ID of the processing target, from among the set of video data stored in the video data DB 121. The video data of the processing target in the recognition phase is one input video data.

Next, the video data preprocessing unit 11 converts the image data in each frame of the target video data to image data represented by pixel values of a predetermined vertical size×predetermined horizontal size×3 channels (RGB)

(S310). For example, the predetermined vertical size may be assumed to be 100 pixels and the predetermined horizontal size may be assumed to be 200 pixels.

Figure 10:
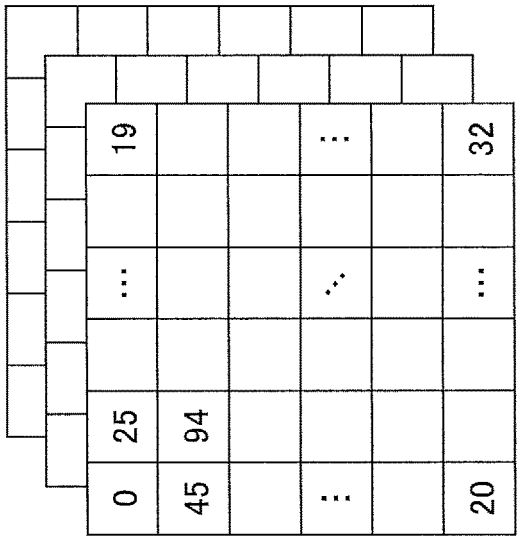
FIG. 10 is a diagram illustrating an example of image data in each frame generated from video data.

FIG. 10 is a diagram illustrating an example of image data in each frame generated from video data. As illustrated in FIG. 10, each image data is associated with the corresponding data ID in the source video data, the frame number associated with the image data of the video data, and the timestamp information of the frame of the video data.

Note that data ID is unnecessary in the recognition phase. In the recognition phase, as video data is input with sensor data corresponding to the video data, the correspondence relationship of the video data and the sensor data is clear.

Next, the video data preprocessing unit 11 performs sampling by a constant frame interval (interval of N frames) of the target video data frames, to reduce redundant data (S320). As a result, a part of the frames is removed.

Next, in order for the image data of each of the sampled frames to be easily usable in the DNN model, the video data preprocessing unit 11 normalizes each pixel value of the image data of each of gear the frames (S330). For example, normalization is performed by dividing each pixel value by the greatest value a pixel can take, such that the range of each of the pixel values is scaled down to a range of 0 to 1.

Next, the video data preprocessing unit 11 outputs video data represented as an image data sequence consisting of image data of each frame normalized in step S330 and date-and-time information of each frame of the video data after sampling (S340). The video data is preprocessed video data of the target video data. Additionally, the date-and-time information of each frame can be obtained by adding the timestamp (FIG. 10) of each frame to the date and time of starting capture (not illustrated in FIG. 5), which is stored for each video data in the video data DB 121. Note that, in the learning phase case, the output destination is the object detection unit 13 and the moving state recognition model learning unit 16. In the recognition phase case, the output destination is the object detection unit 13 and the moving state recognition unit 17.

Figure 11:
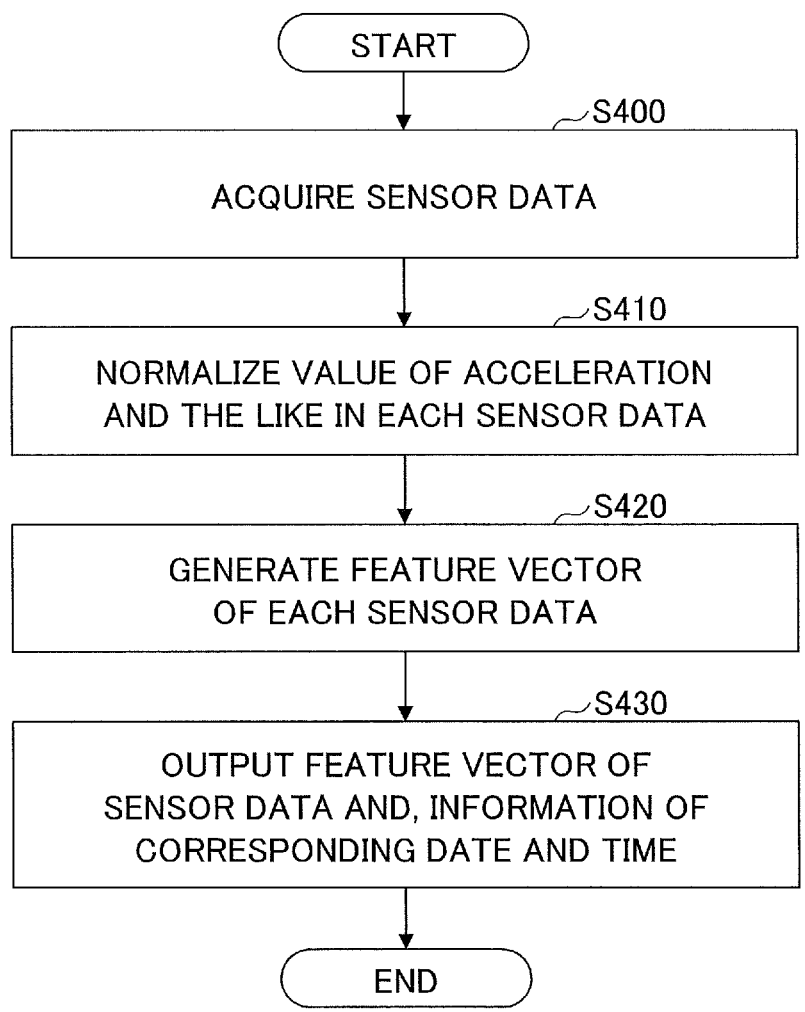
FIG. 11 is a flowchart for explaining an example of a processing procedure executed by a sensor data preprocessing unit 12.

Next, detail of step S110 of FIG. 4 and step S210 of FIG. 8 is described. FIG. 11 is a flowchart for explaining an example of a processing procedure executed by the sensor data preprocessing unit 12. The processing procedure of FIG. 11 is executed for each data ID in the learning phase case and executed for the input sensor data in the recognition phase case.

In step S400, the sensor data preprocessing unit 12 acquires sensor data of a processing target (Hereinafter, this is referred to as "target sensor data".). The sensor data of the processing target in the learning phase case is sensor data associated with the data ID of the processing target, from among the set of sensor data stored in the sensor data DB 122. The sensor data of the processing target in the recognition phase is the input sensor data.

Next, the sensor data preprocessing unit 12 normalizes each measured value of each sensor data of the processing target, so that the sensor data is easily usable in the DNN model (S410). For example, for each of latitude, longitude, and X-axis acceleration and Y-axis acceleration, the sensor data preprocessing unit 12 normalizes such that the mean value is 0 and the standard deviation is 1 for all the sensor data of the processing target.

Next, the sensor data preprocessing unit 12 generates a result of combining each of the normalized values of the respective sensor data, as a feature vector of the respective sensor data (S420). For example, if the measured values included in the sensor data are the four of latitude, longitude, and X-axis acceleration and Y-axis acceleration, the feature vector is constituted by the normalized latitude, the normalized longitude, and the normalized X-axis acceleration and normalized Y-axis acceleration. Note that each feature vector is associated with the corresponding sensor data.

Next, the sensor data preprocessing unit 12 outputs the feature vector of the respective data, and the date-and-time information of each feature vector. The date-and-time information of each feature vector is the value of "date-and-time" stored in the sensor data DB 122 of the sensor data that is the source for the feature vector. Note that in the learning phase case, the output destination is the moving state recognition model learning unit 16. In the recognition phase case, the output destination is the moving state recognition unit 17.

Figure 12:
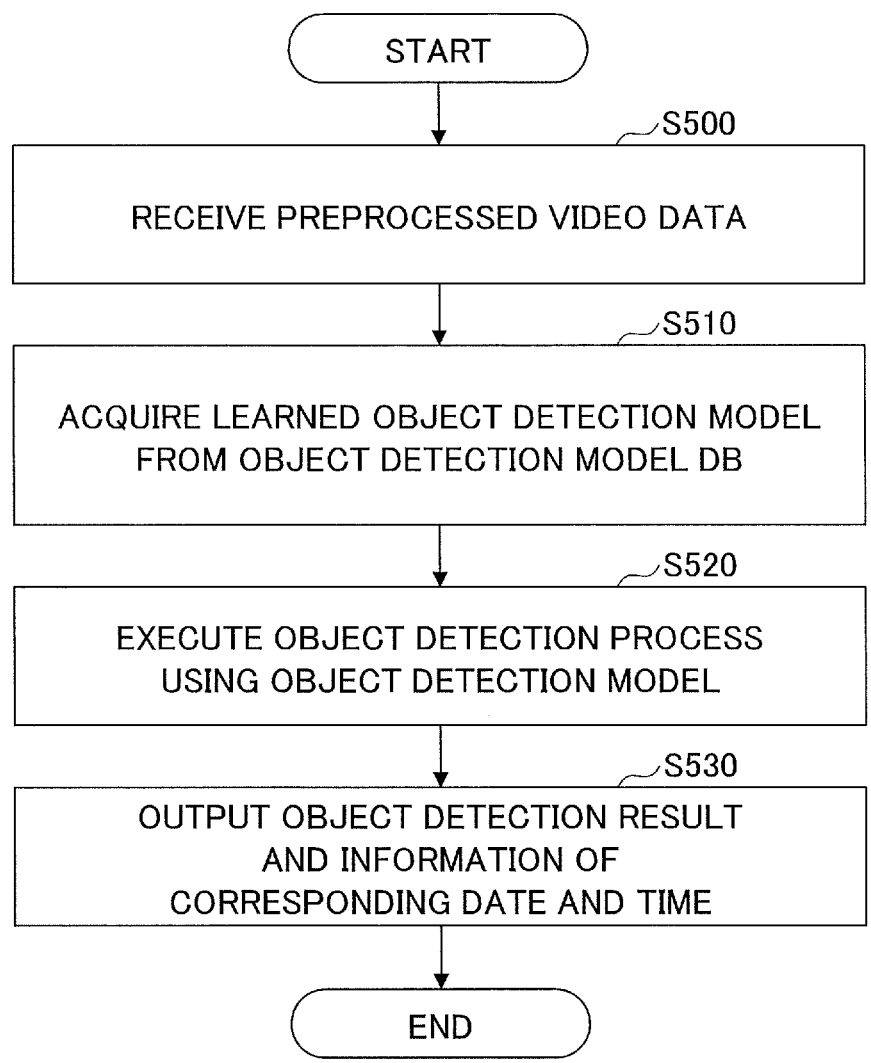
FIG. 12 is a flowchart for explaining an example of a processing procedure executed by an object detection unit 13.

Next, detail of step S120 of FIG. 4 and step S220 of FIG. 8 is described. FIG. 12 is a flowchart for explaining an example of a processing procedure executed by the object detection unit 13.

In step S500, the object detection unit 13 receives preprocessed video data from the video data preprocessing unit 11.

Next, the object detection unit 13 acquires a learned object detection model (model structure and parameters) from the object detection model DB 123 (S510).

Next, the object detection unit 13, using the object detection model, for each frame of the preprocessed video data, executes an object detection process with respect to the image data associated with the frame (S520).

FIG. 13 is a diagram illustrating an example of an object detection result. As illustrated in FIG. 13, the object detection result, for each object detected from the image data associated with the corresponding frame, includes the data ID of the video data in which the frame belongs, the frame number of the frame, the date-and-time information of the frame, a designation representing the object, and information of coordinates (left edge, top edge, right edge, bottom edge) and the like representing the boundary region in which the object in the image data is detected.

Next, the object detection unit 13 outputs the object detection result (FIG. 13) to the spatial feature embedding unit 14 (S530).

Figure 14:
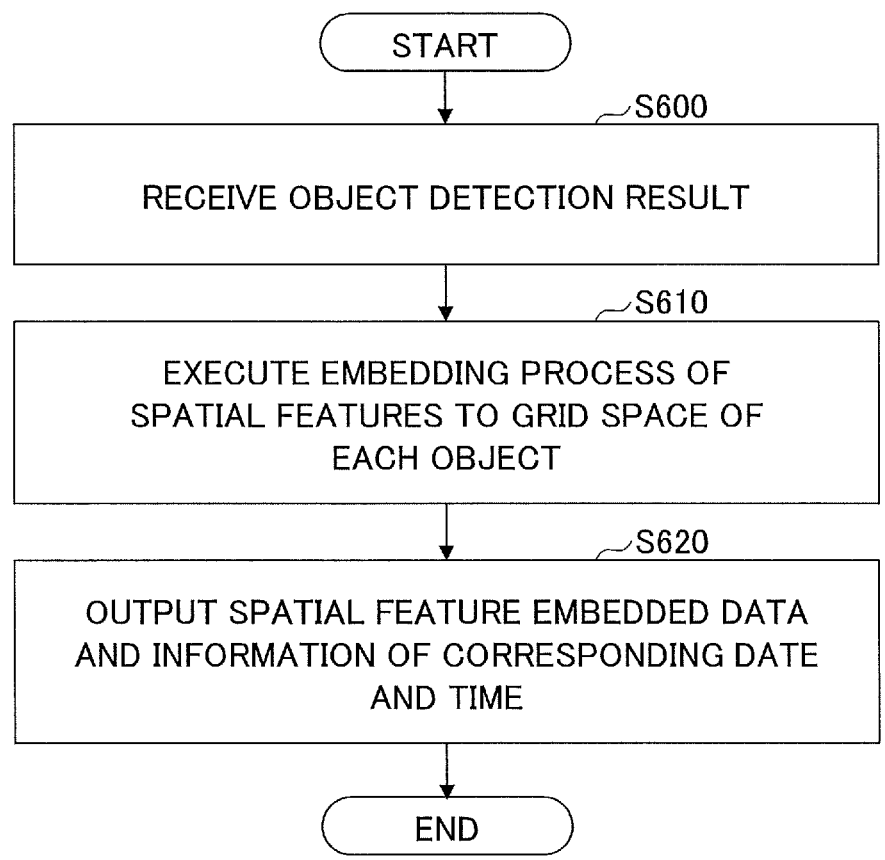
FIG. 14 is a flowchart for explaining an example of a processing procedure executed by a spatial feature embedding unit 14.

Next, detail of step S130 of FIG. 4 and step S230 of FIG. 8 is explained. FIG. 14 is a flowchart for explaining an example of a processing procedure executed by the spatial feature embedding unit 14.

In step S600, the spatial feature embedding unit 14 receives the object detection result from the object detection unit 13.

Next, the spatial feature embedding unit 14 executes an embedding process of spatial features to grid space with respect to objects included in the object detection result, in accordance with a previously defined grid size (S610). As a result of the spatial feature embedding process, spatial feature embedded data is generated.

FIG. 15 is a diagram illustrating an example of spatial feature embedded data. As illustrated in FIG. 15, the spatial feature embedded data is generated for each frame. In other words, step S610 is executed for each group of objects of common frame number in FIG. 13. With respect to one spatial feature embedded data, a configuration of vertical grid×horizontal grid×detectable number of objects is included. Note that detail of an embedding process of spatial features is described later.

Next, the spatial feature embedding unit 14 outputs the respective spatial feature embedded data of each frame and the date-and-time information corresponding to the respective spatial feature embedded data (S620). The date-andtime information corresponding to the spatial feature embedded data can be specified based on the date and time of starting capture of the video data and the timestamp of FIG. 15. Note that in the learning phase case, the output destination is the moving state recognition model learning unit 16. In the recognition phase case, the output destination is the moving state recognition unit 17.

Figure 16:
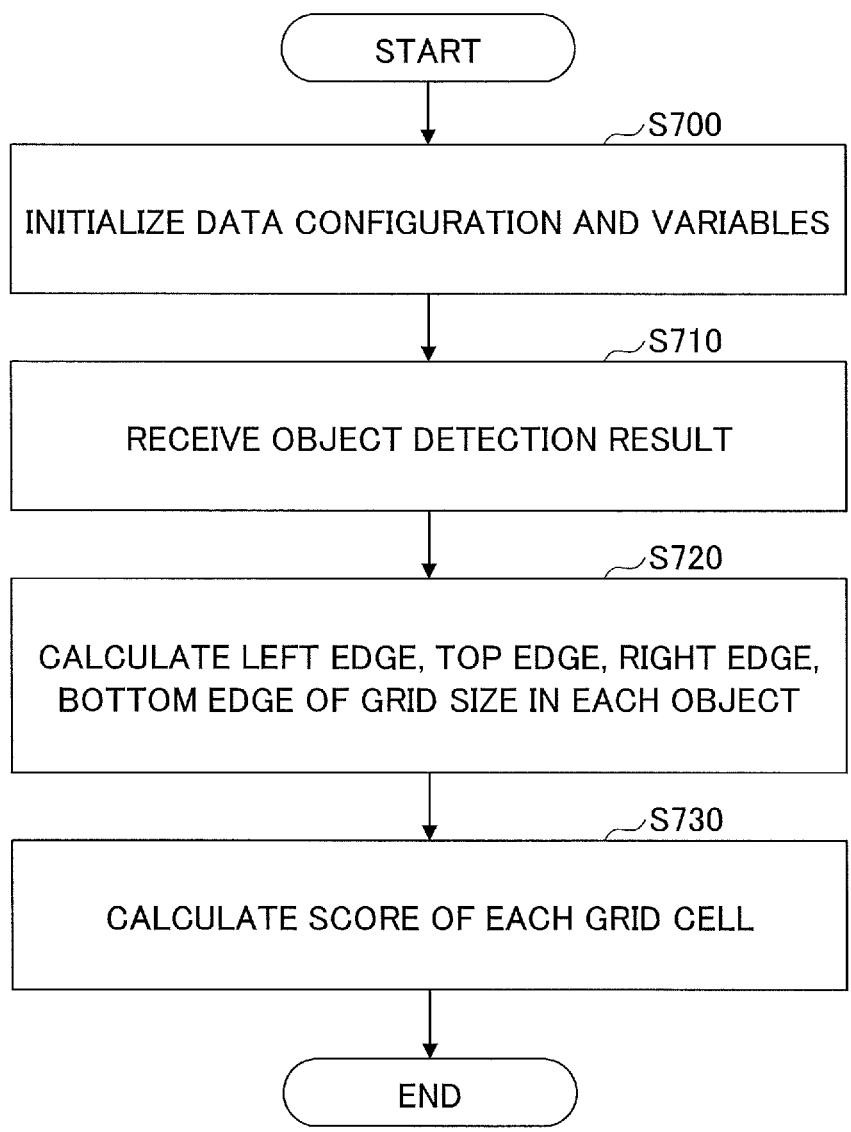
FIG. 16 is a flowchart for explaining an example of a processing procedure of an embedding process of spatial features.

Next, detail of step S610 is described. FIG. 16 is a flowchart for explaining an example of a processing procedure of an embedding process of spatial features. The processing procedure of FIG. 16 is executed for each frame (for each record of common frame number) of the object detection result (FIG. 13).

In step S700, the spatial feature embedding unit 14 initializes the data configuration of the embedding destination, and related variables.

Here, with respect to the image size of the image data of each frame of the preprocessed video data, H represents vertical and W represents horizontal. Note that, as the image size of each image data is standardized by preprocessing, H and W are common to each image data. Additionally, a previously defined vertical grid size is represented as Gh, horizontal grid size as Gw, and the number of detectable object types in the learned object detection model as O. The matrix $G \in R^{Gh \times Gw \times O} \leftarrow 0$ of the embedding destination is initialized. Additionally, the vertical grid unit width Sh for the grid structure of the embedding destination of the spatial features is obtained by $Sh \leftarrow H/Gh$, and the horizontal grid unit width Sw by $Sw \leftarrow W/Gw$.

Next, the spatial feature embedding unit 14 receives the object detection result of the frame of the processing target (S710). Here, the group of objects detected from one frame of the processing target is represented by $\{o_1, o_2, \ldots, o_N\}$. N is the number of objects detected from the frame, and changes by frame. The ID identifying the name of each detectable object is represented by $o_n.\text{id} \in [1, 2, \ldots, O]$, and the coordinates of the left edge, top edge, right edge, and bottom edge representing the boundary region of each object detected from the frame are respectively represented by $o_n.\text{left}, o_n.\text{top}, o_n.\text{right}, o_n.\text{bottom}$.

Next, by the spatial feature embedding unit 14, for each object $n \in [1, 2, \ldots, N]$ detected from the image data of the processing target frame, the left edge index left, the top edge index top, the right edge index right, and the bottom edge index bottom, with respect to the defined grid size, $$\text{left} \leftarrow \left\lceil \frac{o_n \cdot \text{left}}{Sw} \right\rceil, \text{top} \leftarrow \left\lceil \frac{o_n \cdot \text{top}}{Sh} \right\rceil,$$
$$\text{right} \leftarrow \left\lceil \frac{o_n \cdot \text{right}}{Sw} \right\rceil, \text{bottom} \leftarrow \left\lceil \frac{o_n \cdot \text{bottom}}{Sh} \right\rceil$$
[Math. 1]

are respectively calculated (S720).

Next, the spatial feature embedding unit 14 calculates the score of the grid cell $g_{i,j,k}$ as follows, with respect to the index $i(\text{top} \le i \le \text{bottom})$, $j(\text{left} \le j \le \text{right})$, $k \leftarrow o_n.\text{id}$ (S730). Note that the grid cell $g_{i,j,k}$ is the smallest unit of the matrix G of the embedding destination. Here, three types of score calculation formulas are illustrated.

Calculation Example 1) Count the number of appearances of the object k, for each grid cell $g_{i,j,k}$.

$g_{i,j,k} \leftarrow g_{i,j,k}+1$

Calculation Example 2) Consider appearance locations of object k by Gaussian kernel for each grid cell $g_{i,j,k}$.

$g_{i,j,k} \leftarrow g_{i,j,k}+\exp(-|i-m|^2)+\exp(-|j-c|^2), m \leftarrow (\text{top}+\text{bottom})/2, c \leftarrow (\text{left}+\text{right})/2$ Calculation Example 3) Consider area ratio of boundary region of object k to image size for each grid cell $g_{i,j,k} \leftarrow g_{i,j,k}+(\text{height} \times \text{width})/(H \times W), \text{height} \leftarrow o_k.\text{bottom}-o_k.\text{top}, \text{width} \leftarrow o_k.\text{right}-o_k.\text{left}$ The obtained G by $g_{i,j,k}$ being calculated in this manner constitutes the spatial feature embedded data of the frame.

Figure 17:
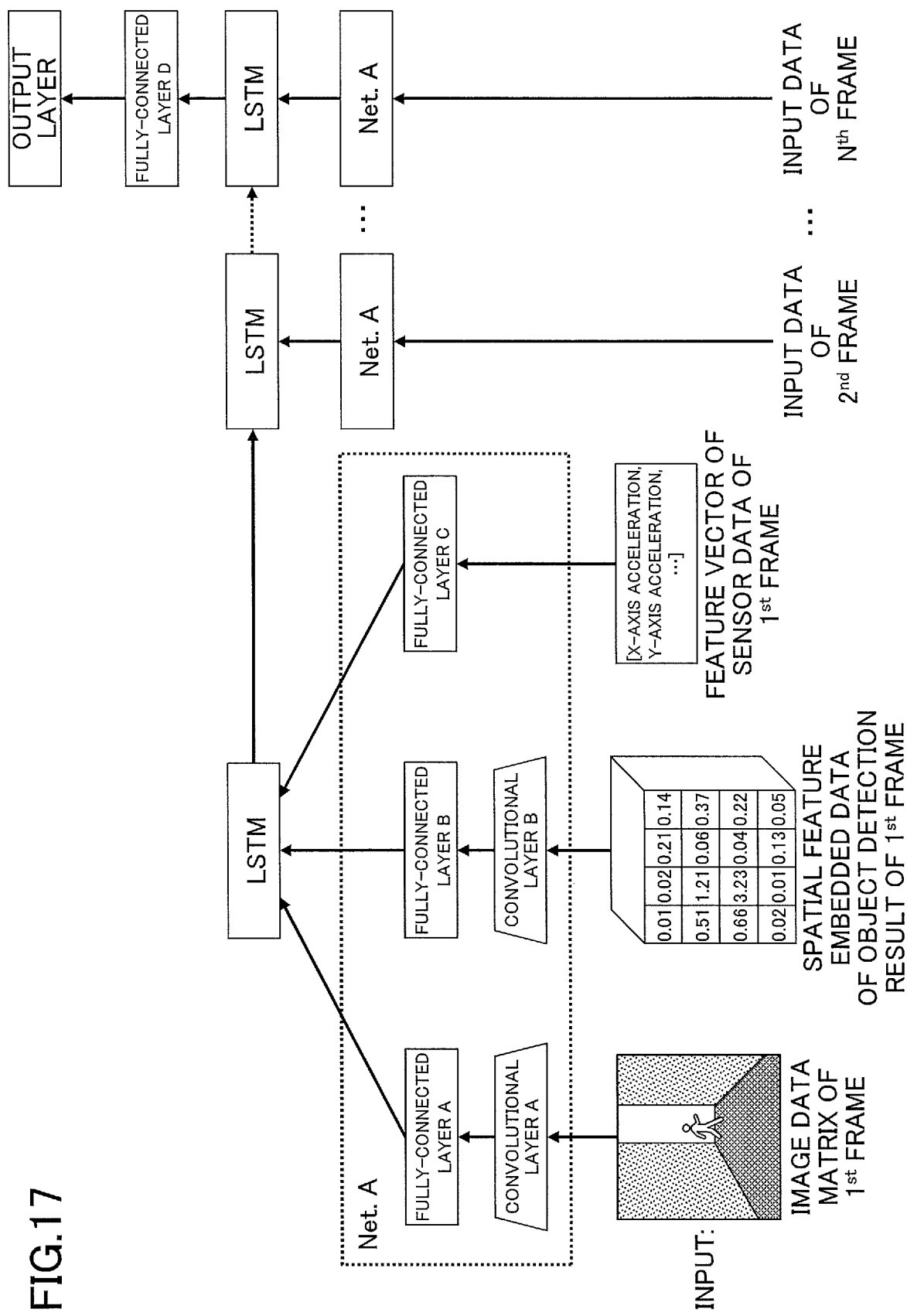
FIG. 17 is a diagram illustrating an example of a structure of a DNN model constructed by a DNN model constructing unit 15.

Next, the DNN model constructed (generated) in step S140 of FIG. 4 is described. FIG. 17 is a diagram illustrating an example of a structure of a DNN model constructed by the DNN model constructing unit 15.

The DNN model obtains the probability of each moving state as output, receiving, as input, the preprocessed video data, the preprocessed sensor data (that is, the feature vector of the sensor data) corresponding to the video data, and the spatial feature embedded data generated based on the video data. As illustrated in FIG. 17, the DNN network is constituted from units such as a convolutional layer A, a fully-connected layer A, a convolutional layer B, a fully-connected layer B, a fully-connected layer C, an LSTM (Long-short-term-memory), and a fully-connected layer D.

Convolutional layer A extracts features from the image matrix (that is, the images set of three channels) of 1 frame. Convolutional layer A, for example, convolutes the image by a 3×3 filter, extracts (max pooling) the greatest value in the specified rectangle, and the like. For the convolutional layer, it is possible to use a network structure or a previously learned parameter that is publicly known such as from AlexNet (Krizhevsky, A., Sutskever, I. and Hinton, G. E.: ImageNet Classification with Deep Convolutional Neural Networks, pp. 1106-1114, 2012.)) The fully-connected layer A further abstracts the features obtained from the convolutional layer A. The fully-connected layer A, for example, using a sigmoid activation function, ReLu activation function, or the like, applies a non-linear transformation to the features of the input.

The convolutional layer B extracts features from the spatial feature embedded data of the object detection result. The convolutional layer B also performs processing similar to the convolutional layer A. In other words, the convolutional layer B, for example, convolutes the spatial feature embedded data of the object detection result by a 3×3 filter, extracts (max pooling) the greatest value in the specified rectangle, and the like.

The fully-connected layer B further abstracts the features obtained from the convolutional layer B. The fully-connected layer B, similarly to the fully-connected layer A, applies a non-linear transformation to the input features.

The fully-connected layer C abstracts the feature vector of the sensor data to a level equivalent to the image features obtained from the fully-connected layer A. The fully-connected layer C, similarly to the fully-connected layer A, applies a non-linear transformation to the feature vector of the input. Note that abstraction to a level equivalent to the image features refers to aligning the scale (range from upper limit to lower limit) of the value of each dimension of the sensor data feature vector, and the number of the dimensions of the feature vector, with the scale of the value of each dimension of the vector indicating the image features, and the number of the dimensions of the vector indicating the image features.

An LSTM further abstracts, as sequential features, the 3 abstracted features output from the fully-connected layer A, the fully-connected layer B, and the fully-connected layer C. Specifically, the LSTM sequentially receives sequential data of features output from the fully-connected layer A, the fully-connected layer B, and the fully-connected layer C, and while circulating past abstracted information, repeatedly applies a non-linear transformation to the sequential data. A publicly known network structure ([Felix A. Gers, Nicol N. Schraudolph, and Juergen Schmidhuber: Learning precise timing with LSTM recurrent networks. Journal of Machine Learning Research, vol. 3, pp. 115-143, 2002.]) in which an LSTM is equipped with a forget gate can also be used.

The fully-connected layer D calculates a probability vector with respect to each moving state, by applying the sequential features abstracted by LSTM to a vector of which the dimension is the number of types of moving states of interest. The fully-connected layer D calculates the probability vector with respect to each moving state, by applying a non-linear transformation such that the sum of all elements of the input features is equal to 1, using a softmax function and the like.

The output layer outputs a probability vector with respect to each moving state. For example, information such as "non near-miss: 10%, car near-miss: 5%, bicycle near-miss: 70%, motorcycle near-miss: 5%, pedestrian near-miss: 5%, other than above: 5%" is output.

Note that as the structure of the DNN model is not affected by the video data and the sensor data, the DNN model may be constructed beforehand and stored in a database.

Figure 18:
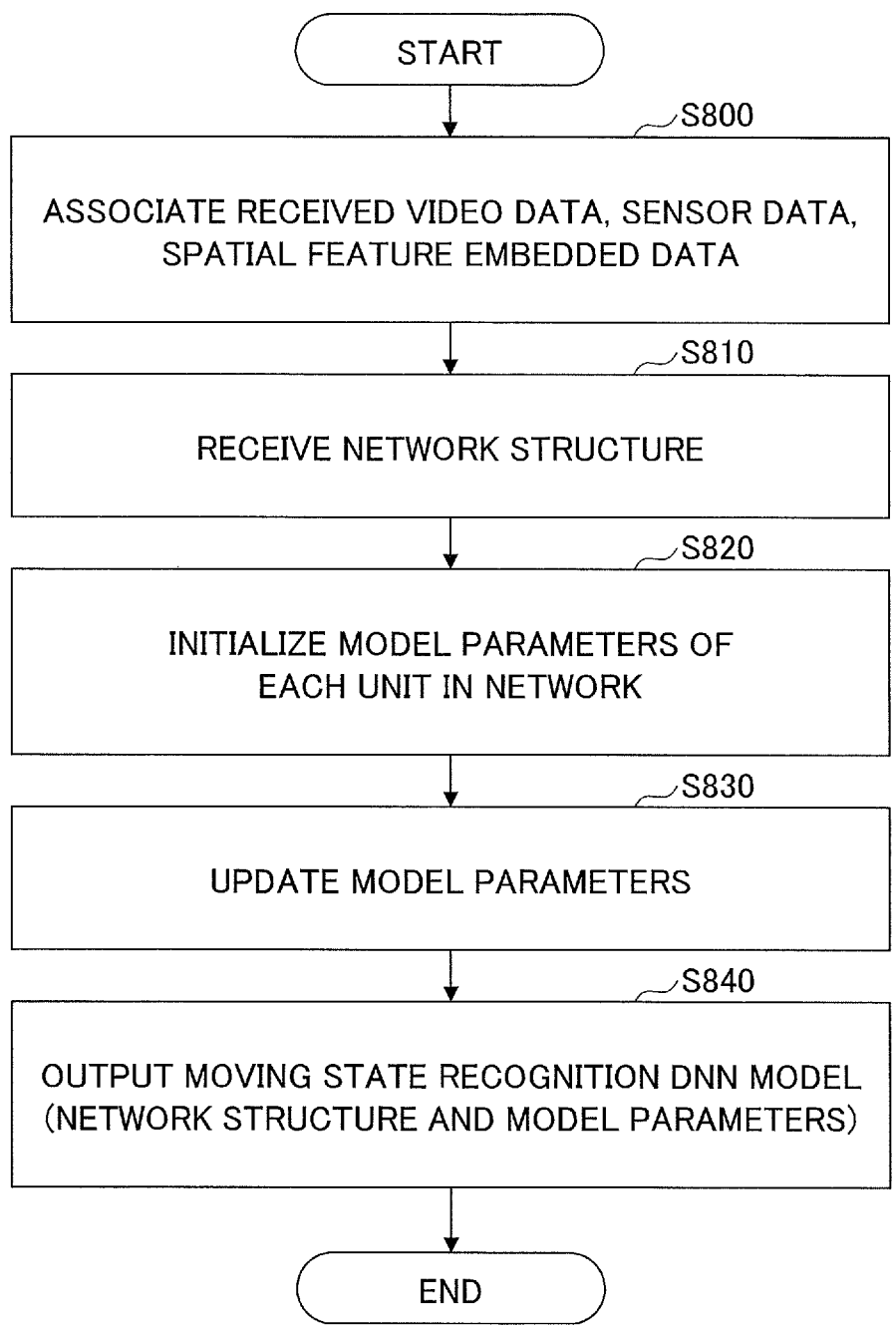
FIG. 18 is a flowchart for explaining an example of a processing procedure executed by a moving state recognition model learning unit 16.

Next, detail of step S150 of FIG. 4 is described. FIG. 18 is a flowchart for explaining an example of a processing procedure executed by the moving state recognition model learning unit 16.

In step S800, the moving state recognition model learning unit 16 associates the image data of the frame of the preprocessed video data, the feature vector of the sensor data, and the spatial feature embedded data in 1:1:1, based on the date-and-time information of each frame of the preprocessed video data, the date-and-time information of the sensor data, and the date-and-time information of the spatial feature embedded data. For example, data of matching date-and-time information or data of which the timing indicated by the data-and-time information is the closest is associated together.

Next, the moving state recognition model learning unit 16 receives the network structure (DNN model) as illustrated in FIG. 17 from the DNN model constructing unit 15 (S810).

Next, the moving state recognition model learning unit 16 initializes the model parameters of each unit in the network (DNN model) (S820). For example, each model parameter is initialized by a random number from 0 to 1.

Next, the moving state recognition model learning unit 16 updates model parameters using the preprocessed video data, the feature vector obtained by the preprocessing for the sensor data corresponding to the video data, the spatial feature embedded data based on the video data, and the annotation names corresponding to the video data (S830). The annotation names corresponding to the video data refer to annotation names stored in the annotation DB that are associated with the same data ID of the video data.

Specifically, the moving state recognition model learning unit 16, for each set of image data, feature vector, and spatial feature embedded data associated in step S800, calculates the model parameters of the DNN model, using the image data, the feature vector, the spatial feature embedded data, and the annotation names stored in the annotation DB 124 associated with the same data ID of the video data to which the image data belongs. In more detail, the moving state recognition model learning unit 16, for each set, determines a probability vector of the output obtained with respect to the image data, the feature data, and the spatial feature embedded data, and a binary vector obtained from the annotation names, and optimizes the model parameters using a publicly known technique such as back propagation so as to minimize the cross-entropy error of the probability vector and the binary vector.

Next, the moving state recognition model learning unit 16 outputs the moving state recognition DNN model (network structure and model parameters), and stores the output result in the DNN model DB 125 (S840).

FIG. 19 is a diagram illustrating an example of model parameters. As illustrated in FIG. 19, parameters are stored as matrices or vectors in each layer. Additionally, for the 1, 2, 3 of the output layer, annotation names (text indicating the moving state) corresponding to respective element numbers of the probability vector for the corresponding moving states calculated in the fully-connected layer D are stored.

Figure 20:
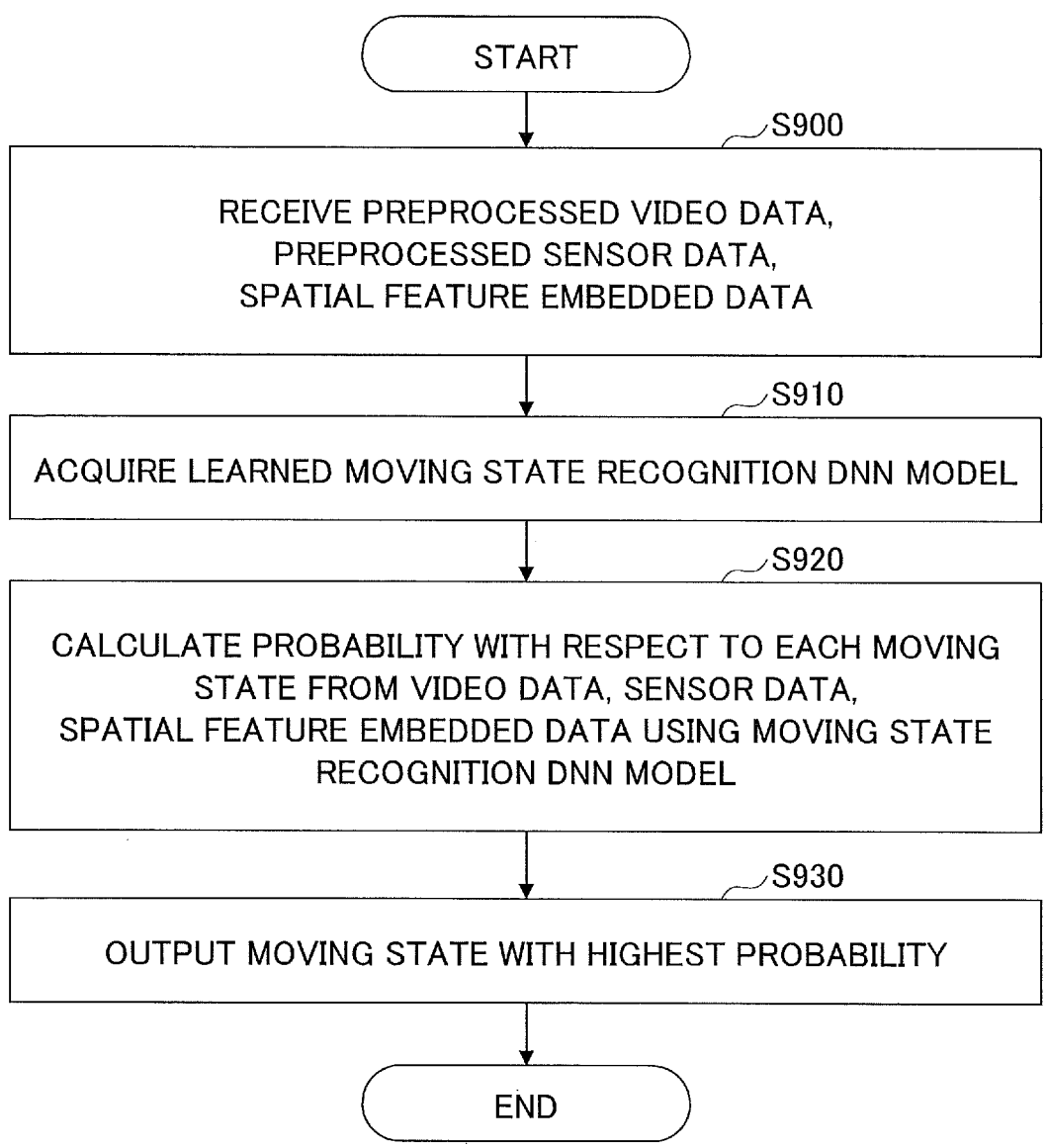
FIG. 20 is a flowchart for explaining an example of a processing procedure executed by a moving state recognition unit 17.

Next, detail of step S240 of FIG. 8 is described. FIG. 20 is a flowchart for explaining an example of a processing procedure executed by the moving state recognition unit 17.

In step S900, the moving state recognition unit 17 receives the preprocessed video data from the video data preprocessing unit 11, receives the preprocessed sensor data from the sensor data preprocessing unit 12, and receives the spatial feature embedded data of the object detection result from the spatial feature embedding unit 14.

Next, the moving state recognition unit 17 acquires a learned moving state recognition DNN model from the DNN model DB 125 (S910).

Next, the moving state recognition unit 17 calculates the probability with respect to each moving state from the video data, the sensor data, and the spatial feature embedded data received in step S900 (S920).

Next, the moving state recognition unit 17 outputs the annotation name associated with the moving state with the highest probability (S930).

Note that, in the present embodiment, although an example of video data and measured data being captured or measured in a vehicle has been described, the present embodiment may be applied to video data and measured data captured in relation to the movement of a person. In this case, the video data may be first-person view video data obtained through eyewear and the like worn by a person, and the sensor data may be sensor data obtained by wearable sensors embodied by the person. Additionally, video data captured of a person from a third-person view, and sensor data obtained from sensors around the person, may be applied to the present embodiment. Additionally, the present embodiment may be applied in relation to a moving body other than a vehicle and a person.

As described above, according to the present embodiment, constructing and learning a model using video data in addition to sensor data and using the acquired model in moving state recognition enables identification of moving states that could not be identified conventionally. As a result, the accuracy of moving state recognition can be improved.

Additionally, a user's moving state can be identified with high accuracy by use of a moving state recognition DNN model provided with a convolutional layer that can handle effective image features for moving state recognition, a fully-connected layer that can abstract features with respect to a suitable abstraction level, and an LSTM that can efficiently abstract sequence data.

Additionally, by using as input data an effective object detection result for moving state recognition, it becomes possible to identify a user's moving state with high accuracy.

Additionally, by feature embedding a detection boundary region of an object detection result into grid space with use as input data, consideration for detection location of the object is made possible, and identification of a user's moving state with high accuracy is made possible. Additionally, it becomes possible to consider the number of detections of the object, the area ratio of the detected region, the center of gravity of the detected region and the like in accordance with the calculation method at the time of spatial feature embedding, and it becomes possible to identify a user's moving state with high accuracy.

Further, by using all of the objects detected in the object detection result as one structured data of embedded spatial features, it becomes possible to reduce the computational cost as compared to a method of treating all of the objects as respective input data.

Note that, in the present embodiment, the moving state recognition device 10 is an example of a moving state analysis device. The video data stored in the video data DB 121 is an example of first video data. The sensor data stored in the sensor data DB 122 is an example of first sensor data. The video data input in the recognition phase is an example of second video data. The sensor data input in the recognition phase is an example of second sensor data. The object detection unit 13 is an example of a detection unit. The moving state recognition model learning unit 16 is an example of a learning unit. The moving state recognition unit 17 is an example of a calculation unit. The spatial feature embedding unit 14 is an example of a generating unit. An annotation name is an example of information that indicates a moving state.

An embodiment of the present invention has been described as above; however, the present invention is not limited to the above-described specific embodiment, and various variations and modifications may be made within the scope of the gist of the present invention recited in the scope of the patent claims.

The present application is based on and claims priority to Japanese patent application No. 2018-107057 filed on Jun. 4, 2018, the entire contents of which are hereby incorporated by reference.

DESCRIPTION OF SYMBOLS

10 moving state recognition device
11 video data preprocessing unit
12 sensor data preprocessing unit
13 object detection unit
14 spatial feature embedding unit
15 DNN model constructing unit
16 moving state recognition model learning unit
17 moving state recognition unit
100 drive device
101 recording medium
102 auxiliary storage device
103 memory device
104 CPU
105 interface device
121 video data DB
122 sensor data DB
123 object detection model DB
124 annotation DB
125 DNN model DB
B bus

What is claimed is:

1. A moving state analysis device comprising:
a memory; and
a processor coupled to the memory and configured to:
detect, from image data associated with a frame, an object and a region of the object, for each of frames that constitute first video data captured in a course of movement of a first moving body; and
learn a deep neural network model that takes video data and sensor data as input and that outputs a probability of each moving state associated with a moving body, based on a combination of at least:
the first video data,
a feature of first sensor data including positioning information measured in relation to the first moving body at a time of capturing the first video data,
a detection result of the object and the region of the object appearing in the first video data, and
information indicating a moving state associated with the first moving body relative to the object detected in the first video data.

2. The moving state analysis device according to claim 1, wherein the processor is configured to:
detect, from image data associated with a frame, an object and a region of the object, for each of frames that constitute second video data captured in a course of movement of a second moving body; and
calculate a probability of each moving state, with respect to the second video data, by inputting into the deep neural network model a combination of at least:
the second video data,
second sensor data measured in relation to the second moving body at a time of capturing the second video data, and
a detection result of the object and the region of the object detected from the image data associated with the frame from which the second video data is constituted,
the deep neural network model being read and executed by the hardware processor.

3. The moving state analysis device according to claim 2, wherein the processor is configured to:
generate, based on the detection result of the object and the region of the object, data indicating for each object a feature of a region in which the object appears;
learn the deep neural network model based on the generated data in relation to the first video data; and
calculate a probability of each moving state associated with the moving body, based on the generated data in relation to the second video data.

4. The moving state analysis device according to claim 1, wherein the positioning information includes either latitude or longitude of a location corresponding to the first moving body.

5. The moving state analysis device according to claim 1, the processor further configured to capture the first sensor data using a sensor.

6. The moving state analysis device according to claim 1, wherein the first video data and the first sensor data are captured on the first moving body, and wherein the first moving body is distinct from the object.

7. A computer-implemented method for analyzing a moving state, the method comprising:
detecting an object and a region of the object from image data associated with a frame, for each of frames that constitute first video data captured in a course of movement of a first moving body; and
learning a deep neural network model that takes video data and sensor data as input and that outputs a probability of each moving state associated with a moving body, based on a combination of at least:

the first video data,
a feature of first sensor data including positioning information measured in relation to the first moving body at a time of capturing the first video data,
a detection result of the object and the region of the object appearing in the first video data, and
information indicating a moving state associated with the first moving body relative to the object detected in the first video data.

8. The moving state analysis method executed by a computer according to claim 7, further comprising:
detecting an object and a region of the object from image data associated with a frame, for each of frames that constitute second video data captured in a course of movement of a second moving body; and
calculating a probability of each moving state, with respect to the second video data, by inputting into the deep neural network model a combination of at least:
the second video data,
second sensor data measured in relation to the second moving body at a time of capturing the second video data, and
a detection result of the object and the region of the object detected from the image data associated with the frame from which the second video data is constituted.

9. The moving state analysis method executed by a computer according to claim 8, further comprising:
generating data indicating for each object a feature of a region in which the object appears, based on the detection result of the object and the region of the object, wherein in the learning, the deep neural network model is learned based on data generated in the generating in relation to the first video data; and
in the calculating, a probability of each moving state associated with the moving body is calculated based on data generated in the generating in relation to the second video data.

10. A non-transitory computer-readable recording medium having a program that causes a computer to execute the moving state analysis method of claim 7.

11. The non-transitory computer-readable recording medium according to claim 10, wherein the positioning information includes either latitude or longitude of a location corresponding to the first moving body.

12. The non-transitory computer-readable recording medium according to claim 10, the method further comprising capturing the first sensor data using a sensor.

13. The non-transitory computer-readable recording medium according to claim 10, wherein the positioning information includes either latitude or longitude of a location corresponding to the first moving body.

14. The computer-implemented method according to claim 7, wherein the positioning information includes either latitude or longitude of a location corresponding to the first moving body.

15. The computer-implemented method according to claim 7, the method further comprising:
capturing the first sensor data using a sensor.

16. The computer-implemented method according to claim 7, wherein the positioning information includes either latitude or longitude of a location corresponding to the first moving body.

* * * * *